(12) United States Patent
Brunsmann

(10) Patent No.: US 7,925,595 B2
(45) Date of Patent: Apr. 12, 2011

(54) METHOD FOR POSTAGE PAYMENT

(75) Inventor: James Edward Brunsmann, San Carlos, CA (US)

(73) Assignee: Neopost Technologies, Bagneux (FR)

( * ) Notice: Subject to any disclaimer, the term of this patent is extended or adjusted under 35 U.S.C. 154(b) by 199 days.

(21) Appl. No.: 12/119,899

(22) Filed: May 13, 2008

(65) Prior Publication Data

US 2009/0287602 A1  Nov. 19, 2009

(51) Int. Cl.
  *G07B 17/02* (2006.01)
(52) U.S. Cl. ...................................... 705/403
(58) Field of Classification Search .............. 705/403
  See application file for complete search history.

(56) References Cited

U.S. PATENT DOCUMENTS

| | | | |
|---|---|---|---|
| 3,848,798 A | | 11/1974 | Riley |
| 5,243,654 A | * | 9/1993 | Hunter ............... 380/51 |
| 5,715,164 A | | 2/1998 | Liechti et al. |
| 5,729,460 A | * | 3/1998 | Plett et al. ............ 705/403 |
| 5,796,841 A | | 8/1998 | Cordery et al. |
| 6,010,069 A | | 1/2000 | Debois |
| 6,064,992 A | | 5/2000 | Herring |
| 6,815,619 B2 | | 11/2004 | Iwasaki et al. |
| 7,120,610 B1 | | 10/2006 | Brookner et al. |
| 7,458,612 B1 | * | 12/2008 | Bennett ................. 283/81 |
| 2003/0065628 A1 | * | 4/2003 | Gargiulo ............... 705/401 |
| 2003/0144972 A1 | * | 7/2003 | Cordery et al. .......... 705/401 |
| 2005/0192912 A1 | | 9/2005 | Bator et al. |
| 2005/0279824 A1 | * | 12/2005 | Anderson et al. ........ 235/380 |

FOREIGN PATENT DOCUMENTS

JP  2002163334 A  6/2002

OTHER PUBLICATIONS

Derrick, John, "The Meter Is Running," Office Systems, Mt. Airy, vol. 11, Iss. 9, Sep. 1994, p. 32.*

* cited by examiner

*Primary Examiner* — John W Hayes
*Assistant Examiner* — Nathan Erb
(74) *Attorney, Agent, or Firm* — Morris & Kamlay LLP

(57) ABSTRACT

A postage funds credit system in which the customer pays for postage funds after they are used in franking mailpieces. A postal device is initialized with postage funds advanced to the customer by a third party. The value of a descending register of the postal device is read a first time and a second subsequent time. The later value is subtracted from the earlier value to obtain an amount of postage funds used by the customer between the two readings. The customer is billed for the amount of postage used after such use. The postal device can be replenished with additional postage funds advanced by the third party.

15 Claims, 3 Drawing Sheets

302

| 301 | 303 | 305 | 307 |
|---|---|---|---|
| TID | DATE/ TIME | AMOUNT | DESCENDING VALUE |

FIGURE 3

| 403 | 405 |
|---|---|
| PSD SERIAL NUMBER | FINANCIAL ACCOUNT INFORMATION |

FIGURE 4

METHOD FOR POSTAGE PAYMENT

BACKGROUND OF THE INVENTION

Field of the Invention

The field of the invention is postage franking devices and in particular the payment for postage funds used by a postage franking device.

Postage representing payment for a postal service makes up a significant portion of expenses of many businesses. For example, an insurance company routinely sends a large number of bills and correspondence to customers via mail, thereby incurring substantial postage.

To facilitate mailing of a large volume of mail, a franking system is often employed to frank, on mailpieces, postage indicia which serve as proof of postage. One such franking system may be a postage meter, or general purpose computer equipment, e.g., a personal computer (PC), having appropriate software installed therein for printing postage indicia using a local/network printer.

To secure accounting of postage dispensation, some postal authorities, e.g., the United States Postal Service (USPS) advocates the use of a postal security device (PSD) in a franking system. For example, the USPS promulgated specifications for the design of the PSD under an Information-Based Indicia Program (IBIP).

In general, a PSD has a secure housing, and within the secure housing are accounting registers and a cryptographic engine. Postage funds can be downloaded to the PSD for use in generating indicia. The usage of the postage funds can be tracked by the accounting registers. These accounting registers typically include an ascending register and a descending register. An ascending register is used to keep track of the amount of postage dispensed. A descending register is used to keep track of the amount of postage available for postage dispensation. The cryptographic engine is used to sign certain postal information contained in a postage indicium to authenticate the same, in accordance with a well known public key algorithm. One such public key algorithm may be the Digital Signature Algorithm (DSA) described, e.g., in "Digital Signature Standard (DSS)," FIPS PUB 186, May 19, 1994. The cryptographic engine also carries out cryptographic authentication and signing for communications between the PSD and a remote data center, which may be maintained by a party other than a postal authority, e.g., a postage metering equipment or service provider. Such communications may be used to set up and maintain the PSD, and to replenish the postage funds by adjusting the value of the descending register in the PSD, in accordance with a well known telemeter setting (TMS) technique.

Certain known methods for paying for the postage funds in a PSD are prepayment methods. That is, a customer authorizes the transfer of money from a customer account to a PSD via a postal service provider that can establish communications with the PSD, such as via download from a remote PSD service center. The postal service provider causes the descending register in the PSD to be incremented, effectively making available money provided by the customer for generating value bearing indicia for placement on mailpieces. A period of time often elapses between the download of funds into the PSD and an actual use of those funds to generate indicia. Depending on the volume of mail sent by the customer and the predictability of the mail volume, the descending register value can be significant, and the difference between the descending register value and the actual amount of postage value consumed each day may be substantial. Such a difference represents undesirable illiquidity to the customer. Money paid by the customer is simply waiting to be used to frank mailpieces, rather than being used for other purposes or gathering interest in a customer bank account.

Certain known methods allow a customer to finance the downloaded funds, such that downloaded funds are not immediately transferred from the customer's financial reserves. Interest is charged to the customer by the postal service provider from the time the funds are downloaded to the customer PSD until the postal service provider is repaid by the customer.

Other known methods allow postpayment by customers. That is, the customer pays for postage only after postage funds are consumed by generating indicia. In one version, a postage meter has only an ascending register that reflects the total amount of postage funds used by the meter. A postal service provider is in periodic communication with the meter, during which it reads the meter's ascending register value. The difference between two successive readings of the ascending register is equal to the amount of postage funds used by the meter between the two reads. This amount is billed to the customer. In other words, the customer pays only after the meter has used the funds to generate indicia. Such meters may not meet regulatory requirements of some postal authorities. For example, in the United States, PSDs are required to have both ascending and descending registers. The descending register must reflect a value sufficient to disburse postage or the PSD will not generate indicia and can be reset to a higher value when funds are downloaded to the PSD. The ascending register maintains the total value of postage disbursed by the PSD, which increases monotonically. It would be advantageous to provide a postage payment arrangement that overcomes these drawbacks.

BRIEF SUMMARY OF THE INVENTION

An embodiment of the invention includes a method of accounting for a transfer of funds from a remote server to a postal device having a descending register which reflects postage funds stored within the postal device. The method includes establishing a first communication link between the postal device and the remote server and obtaining a first value of the descending register. The method further includes establishing a subsequent communication link between the postal device and the remote server after the postal device has dispensed postage funds and decremented the descending register and obtaining, through the subsequent communications link, a second value of the descending register. Based upon a calculated difference between the second value and the first value, the method determines an amount owed for postage used.

A further embodiment includes a postage funds credit system. The system includes a computer system that obtains a first value of a descending register of a postal device. The system further obtains a second, subsequent value of the descending register after the postal device has dispensed postage funds and decremented the descending register and calculates the difference between the first value and the second value. The system causes an account of a customer associated with the postal device to be debited an amount based upon the calculated difference.

BRIEF DESCRIPTION OF THE DRAWINGS

FIG. 3 shows a transaction record in accordance with an embodiment of the present invention FIG. 4 shows a database record in accordance with an embodiment of the present invention.

DETAILED DESCRIPTION OF THE INVENTION

An embodiment of the invention provides a post payment postage arrangement, where a debt associated with use of postage value by a customer is incurred by the customer following consumption, or dispensation of the postage by a franking system, such as upon a mailpiece or mailing label for example.

Figure 1:
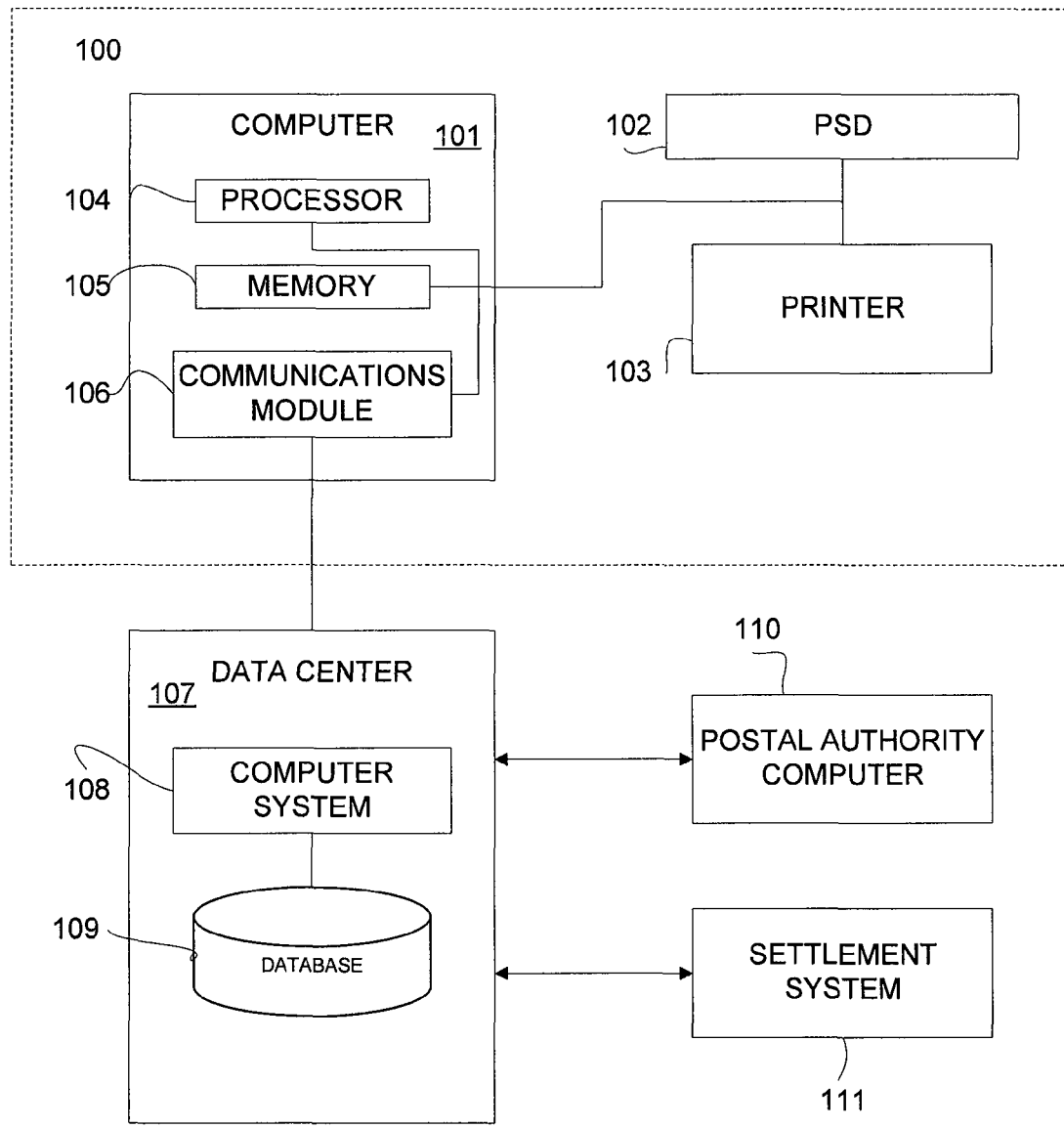
FIG. 1 shows a system in accordance with an embodiment of the present invention

FIG. 1 illustrates franking system 100 in accordance with an embodiment of the present invention. In an embodiment, system 100 can be configured as an "open system," where computer 101 may be a conventional personal computer (PC) serving as a host device, and where a postal security device (PSD) 102 and printer 103 for franking or printing postage indicia are peripherals to computer 101. Alternatively, computer 101 may be a workstation or any other general purpose computing machine, or else a component of a mailing machine such as a Neopost IS-480 Digital Mailing System. PSD 102 and/or printer 103 may include communications modules (e.g., modems, TCP/IP sockets, communications applications, etc.) for communications if one or more of computer 101, PSD 102 and printer 103 are remote from each other. Franking system 100 can be in communication with data center 107, which can help manage funds for postage in cooperation with a postal authority computer 110 and a settlement system 111 that facilitates the transfer of funds between parties.

Computer 101 can include a processor 104 coupled to a memory 105 and a communications module 106. Processor 104 can be a microprocessor or an Application Specific Integrated Circuit that embodies at least part of the method in accordance with an embodiment of the present invention in its hardware and/or firmware. Memory 105 can be any device that can store electronic data, such as RAM, ROM, a hard disk, flash memory, etc. Communications module 106 can include a modem, a TCP/IP socket and a communications application for managing communications with computer 101. Computer 101 can be in communication with PSD 102, printer 103, data center 107 and other components of the present invention. The components of data center 107 are discussed in further detail below.

Figure 2:
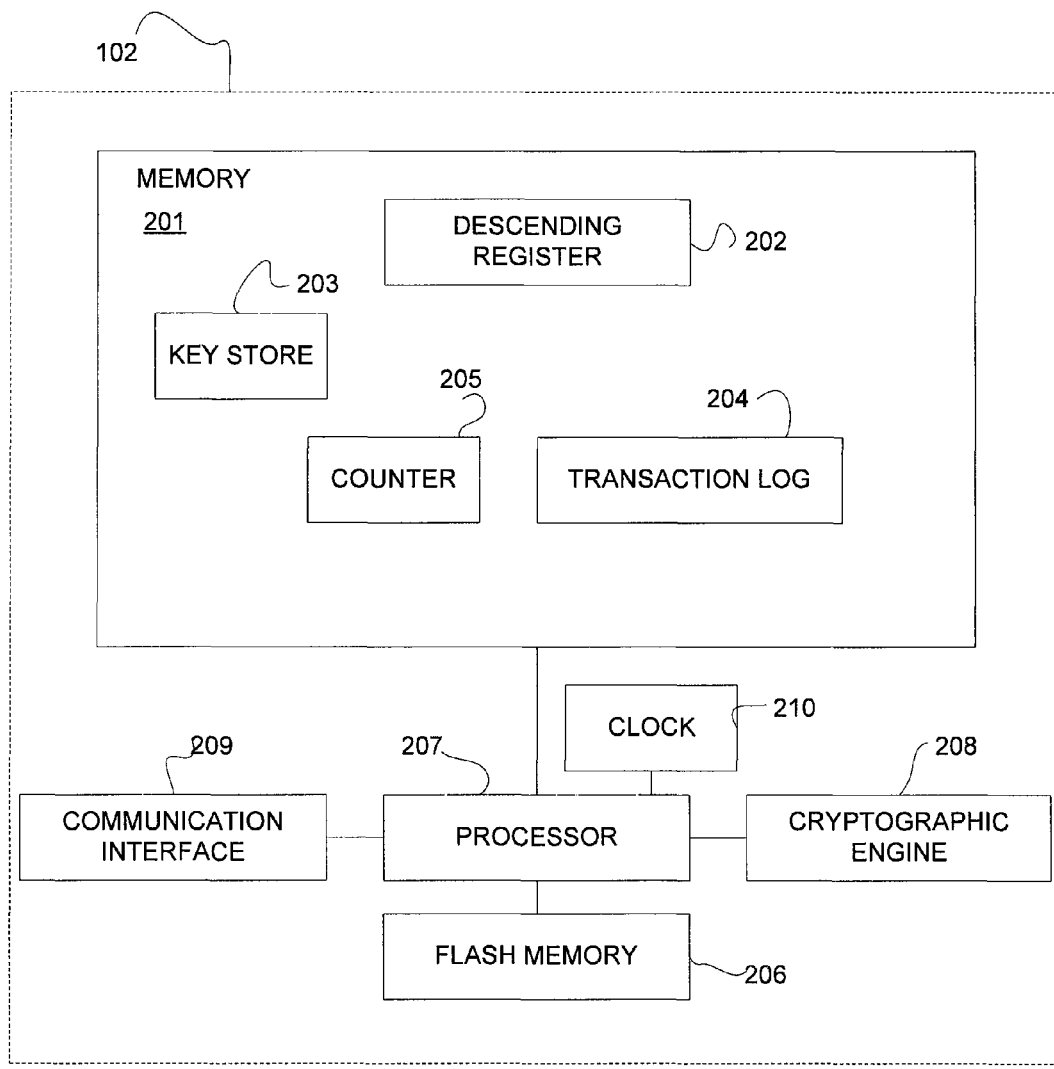
FIG. 2 shows a PSD in accordance with an embodiment of the present invention.

An embodiment of PSD 102 is shown in greater detail in FIG. 2. PSD 102 may be secured by well known hardware protection means and other tamper-resistant methodologies. PSD 102 can include processor 207, clock 210, memory 201, flash memory 206, communications interface 209 for interfacing with computer system 108, and cryptographic engine 208. Memory 201 (which can be Static Random Access Memory (SRAM)) can include a descending register 202 that stores a descending register value that represents the amount of postage funds available for use by the PSD 102. When PSD 102 disburses an indicium with a given amount of postage, the descending register value is decreased by that amount. Known PSDs also include an ascending register (not shown) that accumulates the value of all postage disbursed by the PSD. Embodiments of the present invention are capable of operating without an ascending register, as described below. Memory 201 can also store cryptographic material, such as public/private key pairs in key store 203. Transaction log 204 can store records of franking transactions, transaction counter 205 values and other administrative information.

Because the contents of memory 201 may need to be refreshed from time to time, memory 201 can be powered by a battery (not shown.) If battery power should be unexpectedly lost, the descending register 202 value and the contents of the transaction log 204 can be redundantly stored in flash memory 206. Flash memory 206 also contains program instructions for processor 207 to orchestrate, in concert with cryptographic engine 208, the operation of PSD 102. This operation includes generation of digital signatures for inclusion in postage indicia to be franked or printed by printer 103 on mailpieces. The digital signatures can be used to authenticate the respective postage indicia. In an embodiment, the Digital Signature Algorithm (DSA) described, e.g., in "Digital Signature Standard (DSS)," FIPS PUB 186, May 19, 1994 can be used to generate such signatures. Cryptographic engine 208 can use a private key stored in key store 203 to sign certain postal data. The resulting digital signature, which can be distinct for each postage indicium, can be included in the indicium.

Unlike a public key, which may be made available to the public in the postage indicium, the corresponding private key needs to be securely stored in PSD 102. Otherwise, using a private key that is obtained by, for example, tampering with PSD 102, a perpetrator may fraudulently generate postage indicia without accounting for the postage value expended. Thus, to prevent fraud such as any tampering with PSD 102, battery power may be cut off, thereby "zeroizing" or clearing some or all contents of one or both of memory 201 and key store 203.

A public/private key pair the same as or distinct from the pair used to generate digital signatures can be used for authenticating communications with computer 101 or data center 107 through communication interface 209.

To help keep track of the franking transactions handled by PSD 102, processor 207 maintains counter 205 in memory 201, which maintains a value corresponding to the number of transactions processed by PSD 102. For example, processor 207 can cause counter 205 to increase its count by one each time postage is franked upon a mailpiece to account for a new franking transaction. Thus, the current count can be used to identify the franking transaction being conducted. Processor 207 can also maintain transaction log 204, which can records information about franking transactions.

Returning to FIG., data center 107 can communicate with franking system 100 (as well as other franking systems, not shown) to obtain data to account for postage consumption. These connections may be dial-up connections, Internet connections, etc. The data communications between data center 107 and an exemplary franking system 100 may be in accordance with the protocol disclosed in U.S. Pat. No. 5,715,164 issued Feb. 3, 1998 to Liechti et al., which is hereby incorporated by reference in its entirety. Data center 107 can include a computer system 108 and a database 109. Computer system 108 can include a processor coupled to a memory storing instructions adapted to perform at least part of the method in accordance with an embodiment of the present invention. Data center 107 can communicate with a postal authority computer 110 and a settlement system 111 as described below.

Computer system 108 can be coupled to database 109. Computer system 108 can include a processor coupled to memory. The processor can be a general purpose microprocessor or an Application Specific Integrated Circuit (ASIC) that embodies at least part of the method in accordance with an embodiment of the present invention in its hardware and/or firmware. The memory can be any suitable device for storing electronic information, such as RAM, ROM, a hard disk, flash memory, etc. The memory can store instructions adapted to be executed by the processor to perform at least part of the method in accordance with the present invention. For example, the instructions can cause the processor to read successive values of the descending register 202 of a PSD 102, subtract the later value from the earlier value, and calculate the amount of postage used by the PSD 102. Likewise, the instructions can cause a certain amount of postage value to be downloaded to a PSD 102, and can account for such downloaded value in calculating the postage used between successive reads of the PSD 102 descending register 202. Also, the instructions can include rules limiting the amount of postage value that can be downloaded to the PSD 102, as described herein. The instructions can cause the processor to store records of the descending register values, amounts of postage used, financial account information for a customer associated with PSD 102, and other useful information in database 109. The instructions can cause the processor to interact with a postal authority computer 110 and a settlement system 111 to ensure that the proper accounts are debited and credited in accordance with an embodiment of the present invention.

In accordance with some postal regulations, at a same time that postage funds are disbursed to PSD 102 by increasing the PSD's 102 descending register, the postal authority (such as that United States Postal Service) is to be paid immediately. In known systems, a customer account is debited (and the corresponding debt is incurred by the customer) when the postage funds are added to the PSD 102. In accordance with an embodiment of the present invention, a process known as initialization provides an initial amount $P_0$ of postage funds by a third party to a customer's PSD 102. For example, a postal service provider (e.g., the operator of data center 107) can establish a first communication link between the system 100 and the computer system 108 to deposit the initial amount $P_0$ of postage funds to the customer's PSD 102. The amount $P_0$ of the postage funds can be debited from an account of the postal service provider and credited to an account of the postal authority via postal authority computer 110 by a settlement authority, such as a bank. Subsequently, after the system 100 has dispensed postage funds and decremented the descending register 202, postal data center 107 can establish a subsequent communication link to communicate with PSD 102 and obtain a reading of a value P1 in the descending register 202. Computer system 108 in data center 107 can subtract the read value of the descending register 202 from the known initial amount $P_0$ of postage in the PSD 102 to determine a measurement of postage funds the customer has used since the PSD 102 was initialized. That is, $$F_0 = P_0 - P_1$$

where $F_0$ is the amount of postage used by the customer PSD 102. The customer can then be charged for the postage used. The customer can be invoiced, or elect to have a customer account be debited for an amount equal to $F_0$. Monies can be transferred from and to checking accounts, debit accounts, credit accounts, revolving credit accounts, prefunded accounts, escrow accounts, etc., in accordance with embodiments of the present invention. In this way, the debt related to postage consumption can be incurred by the customer on a postpay, rather than a prepay basis.

Additional funds can be added to the PSD 102 by the postal service provider data center 107 by communicating with the PSD 102 and causing the value of the descending register 202 to be increased. This can be done at no immediate charge to the customer. In effect, the postal service provider is advancing to the customer the funds needed to frank the customer's mailpieces. When the money is advanced (e.g., when the descending register 202 is increased by the data center 107), an account of the postal service provider is debited and an account of the postal authority is credited to provide payment to the postal authority for the amount of the increase. The postal service provider is reimbursed when the customer pays for postage funds it used, based upon readings taken by data center 107 of the descending register 202. It will be appreciated that in some embodiments the postal service provider may be immediately reimbursed by a fourth party, such a financial clearing house or trust account for example, and the corresponding debt repaid by the customer to the fourth party. Further, it will be appreciated that such fourth parties may be referred to herein as a "third party" relative to the customer and postal authority.

In general, if $P_n$ is a value of the descending register 202 at a first time, and $P_{n+1}$ is a value read at a subsequent time, an amount $F_n$ of postage funds used by the customer is calculated by computer system 108 to be the difference between $P_n$ and $P_{n+1}$:

$$F_n = P_n - P_{n+1}$$

The postal service provider or fourth party can then determine an amount owed of postage based upon the calculated difference. The amount owed, plus appropriate service fees, minus discounts, with appropriate credits applied, etc may be invoiced to the customer. Alternatively, the amount owed (including any adjustments) may be debited from an account of the customer and credited to an account of the postal service provider or fourth party.

Computer system 108 can cause the descending register 202 to be increased, i.e., postal funds to be replenished in accordance with any suitable method. In embodiments of the present invention, the replenishment value (also, "replenishment amount") can be calculated based upon factors such as any one or more of the customer's payment history, average amount of postage funds used over a given period, etc. A maximum limit for a download can be set for a single PSD 102 or group of PSDs 102 (e.g., for a group of PSDs 102 operated by the same customer.) Replenishment can be triggered by a request for additional postage funds from the customer or the PSD 102.

Replenishment may also be triggered when the value of the postal funds remaining within the descending register 202 falls below a certain threshold. This can be detected by the computer 101 or computer system 108 reading the descending register 202 value periodically. Repeating the above process each time a franking system 100 requests postage to be downloaded allows determination of the total postage dispensed between any two replenishment dates. It will be appreciated that a communication link between the system 100 and the data center 107 (and thus determination of postage dispensed) need not occur in conjunction with postage replenishment. For example, the connection may be established on a regular or irregular time interval, while funds replenishment may occur based upon a balance of the descending register.

In an embodiment of the present invention, computer system 108 can initiate communications with franking system 100 from time to time to obtain transaction records from which the postage consumption can be derived in a manner described below. Such postage consumption can be accounted for by charging an account associated with the franking system 100, where such account may be a checking account, debit account, credit account, revolving credit account, prefunded account, escrow account, etc., held by one or more financial institutions. To that end, data center 107 can maintain database 109 therein, which can store financial account records concerning the respective one or more franking systems 100 served by data center 107. Alternatively, database 109 may be remote from data center 107.

In embodiments of the present invention, the PSD 102 can include an ascending register (not shown), a descending register and a control register (not shown). When PSD 102 communicates with data center 107 (e.g., to download postage funds), a record can be created and stored in database 109. The record can include the date, the value of the ascending register, the value of the descending register, and the control register at the time of the connection. Upon a subsequent connection between the same PSD 102 and the data center 107, another record that can include the same types of data can be created and stored in database 109. The amount of postage dispensed between the date and time of the first connection and the date and time of the second connection can be determined by calculating a difference between the ascending register value recorded from the first connection and the ascending register value recorded from the second connection. This calculated difference can also be stored in database 109. In an embodiment, data center 107 can send to a trust account holder (also herein referred to as a fourth party) information based upon the calculated difference to be posted as a debit to a customer's account. The data center 107 can generate and send to the customer an invoice based upon the calculated difference. In this way, the data center 107 can determine and account for the amount of postage dispensed by the PSD 102 between any two connections of the PSD 102 to data center 107.

In accordance with various embodiments of the present invention, data center 107 may impose controls on the amount of and rate at which a customer may request amounts of postage for download to the PSD 102. This can control the risk or opportunity cost of the postal service provider or fourth party extending credit to the customer. For example, data center 107 can calculate the average monthly amount of postage dispensed by a specific PSD 102, and establish a maximum monthly limit for postage funds to download, such as a limit that is equal to a multiple of that number. Accordingly, the sum of a requested postage download at a given time and any postage downloaded since the beginning of the present month could be limited to no more than the maximum monthly limit. The average may be taken over any suitable number of months. For example, a PSD 102 may have dispensed $100 of postage each month, averaged over the past six months. The customer may be limited to downloading no more than twice (any suitable multiple may be used) the average monthly amount, which in this case would be $200. Suppose a PSD 102 has downloaded $75 since the beginning of the present month, connects to data center 107 and requests that $50 of postage be downloaded to it. Since the sum of the amount downloaded already during the month, $75, and the requested amount, $50, is less than the monthly limit of $200, the request can be fulfilled. If, on the other hand, the PSD 102 requests $150, the aggregate amount of $75+$150 would exceed the monthly limit of $200 and be denied. Alternatively, the customer could be offered the opportunity to download an amount that would bring the PSD 102 up to its monthly limit. Also, when a PSD 102 attempts to exceed its monthly limit, data center 107 can generate an alert to be sent to a system administrator for investigation. Repeated attempts to exceed the limit may initiate a call to the customer from customer service, or may indicate an attempted fraud.

Another safety feature can include a velocity check. Data center 107 can calculate the average number of download requests per unit time over a period of time and then set a maximum limit for the greatest number of requests for download per unit time from the PSD 102. For example, if the average rate of requests is five per month, data center 107 may impose a limit of 12 (any number may be used) requests per month from that PSD 102. In that case, the sum of the number of requests already made in a given month and the present request may not exceed the upper limit. Thus, if there have already been 12 requests for download in the present month and a thirteenth request is received, data center 107 can deny the request. Data center 107 can also generate an alert to a system administrator that the velocity limit for a given PSD 102 has been attempted to be exceeded. Other measures for velocity checks can also be used besides a monthly average. For example, the velocity limit can be a multiple of the highest number of requests for download per month over the past several months.

FIG. 3 shows the format of a transaction record 302 in log 204 in accordance with an embodiment of the present invention. In this instance, each transaction is identified by a transaction identifier (TID) in field 301 of the record 302. Field 303 includes information concerning date and time of the transaction, as may be provided by clock 209. Field 305 includes information concerning the transaction amount, i.e., the postage franked in the transaction. Field 307 includes the descending register value as a result of the transaction. When PSD 102 is initially put in service, an initial record is created in log 204. In this initial record 302, field 301 includes TID=0; field 303 indicates the date and time that PSD 102 is put in service; field 305 includes zero as the transaction amount since no postage has been franked; and field 307 includes an initial credit amount advanced from the postal service provider (e.g., $100) as the initial descending register 202 value (corresponding to 0, as described above).

In an embodiment, when processor 207 conducts the first franking transaction to dispense a first postage value in response to a user request communicated through computer 101, processor 207 causes counter 205 to increase its count from zero to one, thereby identifying the first franking transaction with TID=1. In addition, processor 207 subtracts the first postage value from the current descending register 202 value. Processor 207 thereafter transmits to cryptographic engine 208 postal data elements to be signed by engine 208 for generating a digital signature.

In response, cryptographic engine 208 transmits the digital signature to processor 207 for inclusion in a postage indicium to be printed by printer 103, thereby accomplishing the first franking transaction. Processor 207 then posts the transaction by creating record 302 in log 204, in accordance with the format shown in FIG. 3. The resulting record 302 includes TID=1 in field 301, the date and time that the first transaction occurs in field 303, the first postage value in field 305 and the updated descending register 202 value in field 307. The updated value in descending register 202 and the newly created record in log 204 can be redundantly stored by processor 207 in flash memory 206. Processor 207 conducts subsequent franking transactions and creates corresponding records in a manner similar to the above.

FIG. 4 shows an exemplary format of each financial account record in database 109. In this instance, each franking system 100 is identified by a unique identifier, such as a preassigned PSD 102 serial number in field 403 for example. Field 405 contains information concerning the financial account associated with the franking system 100, which includes a financial account number, and data identifying the financial institution with which the account is maintained.

Since the number of franking systems served by data center 107 may be significant and their geographic locations (and thus the time zones in which they are located) may be very different, computer system 108 may select not to communicate with all of the franking systems at the same time. In one embodiment, computer 108 communicates with the franking systems in a staggered manner. For example, the communication with each franking system takes place between the last mail pick-up of the day in the area where the franking system resides and the first mail pick-up of the following day in that area.

Thus, for example, if the last mail pick-up on each business day in the area where franking system 100 resides is at 5 p.m. (local time) and the first mail pick-up is at 8 a.m. the following business day, computer system 108 may be programmed to communicate with system 100 between 5 p.m. each business day and 8 a.m. the following business day, e.g., 5:20 p.m. That is, at 5:20 p.m. each business day, computer system 108 initiates communications with system 100 to obtain those records in transaction log 204 having field 303 time-stamped after 5 p.m. of the previous business day up to 5 p.m. of the current business day. Thus, the present postage finance arrangement accounts for the expended postage for which postal service has been rendered. The transaction records can be digitally signed for authentication by computer system 108.

It should be noted that if the mail pick-up times concerning a franking system vary, e.g., from day to day, the schedule of communications with the franking system can be programmed accordingly in computer system 108 to realize the present postage finance arrangement in view of the mail pick-up time variation.

Computer system 108 can then compute the total postage dispensed in the franking transactions based on the received records as described above. It should be noted that the received records can be in chronological order, with the first record time-stamped earliest in the current reporting cycle. Computer system 108 can subtract the descending register 202 value in field 307 of the last received record 302 from that of the first received record 302. Such a value would equal the postage franked during the current reporting cycle. In response, settlement system 111 causes a transfer of funds in the amount of the franked postage from a financial account associated with the customer to a financial account associated with the third or fourth parties (e.g., the postal service provider, a credit company, a financial clearinghouse, a trust account holder, etc.) that advanced the postage funds to the customer PSD 102.

The time at which descending register 202 is replenished can effect the calculation of postage funds used, and should be taken into account. If a replenishment occurs between two successive readings of the descending register 202, the amount of the replenishment need not be billed to the customer. For example, if an amount $P_r$ of postage funds is added to the descending register 202 by computer system 108 between reading n and reading n+1 of the descending register 202, the total amount of postage funds used by the customer during that period can be calculated by computer system 108 as follows:

$$F_n = P_n - P_{n+1} + P_r$$

The timing and amount of a replenishment of the descending register can be stored in database 109 and taken into account when calculating $F_n$. Alternatively, the timing and amount can be stored in a transaction record by PSD 102 in transaction log 204. Such a replenishment can be reported to computer system 108. This can be especially useful if a third party other than data center 107 replenishes the descending register 202.

The foregoing merely illustrates the principles of the invention. It will thus be appreciated that those skilled in the art will be able to devise numerous other arrangements which embody the principles of the invention and are thus within its spirit and scope.

For example, in the disclosed embodiment, certain communication data is cryptographically signed for authentication purposes. It will be appreciated that such data may be cryptographically encrypted and/or signed. In addition, in the disclosed embodiment, the DSA is illustratively used to perform data authentication, another well-known data authentication algorithm such as the RSA or Elliptic Curve algorithm may be used, instead. PSD 102 is described herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A method of accounting for a replenishment of postage funds from a remote server to a postal device having a descending register, the method comprising, in the order recited:

establishing a first communication link between the postal device and the remote server, the postal device storing the postage funds which total amount is reflected in the descending register;

obtaining, through the first communication link, a first value of the descending register;

sending a postage funds replenishment value to be added to a current value of the descending register at the postal device;

establishing a subsequent communication link between the postal device and the remote server after the postal device has dispensed at least some of the postage funds and decremented the descending register for a plurality of postal transactions;

obtaining, through the subsequent communication link, a second value of the descending register;

calculating, by the remote server, a difference between the second value and the first value; and determining, by the remote server, an amount owed for postage used by adding the postage funds replenishment value to the calculated difference to obtain the amount owed.

2. The method of claim 1, wherein the step of establishing the first communication link comprises receiving a first request for additional postage funds from the postal device.

3. The method of claim 2, wherein the step of establishing the subsequent communication link comprises receiving a second request for additional postage funds from the postal device.

4. The method of claim 1, further comprising causing the postage funds replenishment value to be debited from an account of a third party and credited to an account of a postal authority.

5. The method of claim 4, further comprising causing the determined amount owed for postage used to be debited from a customer account and credited to the account of the third party.

6. The method of claim 1, further comprising calculating a maximum postage funds replenishment value based upon the average monthly postage funds usage for the postal device.

7. The method of claim 1, further comprising calculating a maximum postage funds replenishment value based upon a payment history of a customer associated with the postal device.

8. A postage funds credit system, comprising:
a computer system comprising:
a processor; and
a memory communicatively coupled to the processor;
said computer system configured to perform a method comprising, in the order recited:
obtaining a first value of a descending register of a postal device;
adding a postage funds replenishment value to a current value of the descending register at the postal device;
obtaining a second value of the descending register after the postal device has dispensed at least some postage funds and decremented the descending register for a plurality of postal transactions;
calculating the difference between the first value and the second value;
determining an amount owed for postage used by adding the postage funds replenishment value to the calculated difference to obtain the amount owed; and
causing an account of a customer associated with the postal device to be debited an amount based upon the calculated difference.

9. The postage funds credit system of claim 8, wherein the computer system receives a first request for additional postage funds from the postal device.

10. The postage funds credit system of claim 9, wherein the computer system receives a second request for additional postage funds from the postal device.

11. The postage funds credit system of claim 8, wherein the computer system causes the postage funds replenishment value to be debited from an account of a third party and credited to an account of a postal authority.

12. The postage funds credit system of claim 11, wherein the computer system causes the amount owed for postage to be debited from the account of the customer and credited to the account of the third party.

13. The postage funds credit system of claim 8, wherein the computer system calculates a maximum postage funds replenishment value based upon the average monthly postage funds usage for the postal device.

14. The postage funds credit system of claim 8, wherein the computer system calculates a maximum postage funds replenishment value based upon a payment history of the customer associated with the postal device.

15. The postage funds credit system of claim 8, wherein the method further comprises adding a second postage funds replenishment value to the descending register subsequent to adding the funds replenishment value to the descending register and prior to obtaining the second, subsequent value of the descending register.

* * * * *